(12) United States Patent
Fortney

(10) Patent No.: US 11,550,938 B2
(45) Date of Patent: Jan. 10, 2023

(54) AUTOMATIC DEVICE ZEROIZATION

(71) Applicant: Science Applications International Corporation, Reston, VA (US)

(72) Inventor: George Fortney, Toms River, NJ (US)

(73) Assignee: Science Applications International Corporation, Reston, VA (US)

(*) Notice: Subject to any disclaimer, the term of this patent is extended or adjusted under 35 U.S.C. 154(b) by 275 days.

(21) Appl. No.: 16/559,164

(22) Filed: Sep. 3, 2019

(65) Prior Publication Data
US 2021/0064768 A1    Mar. 4, 2021

(51) Int. Cl.
*G06F 21/00* (2013.01)
*G06F 21/62* (2013.01)
*G06F 21/32* (2013.01)

(52) U.S. Cl.
CPC .............. *G06F 21/62* (2013.01); *G06F 21/32* (2013.01); *G06F 2221/2133* (2013.01); *G06F 2221/2139* (2013.01); *G06F 2221/2143* (2013.01)

(58) Field of Classification Search
CPC .. G06F 21/62; G06F 21/32; G06F 2221/2143; G06F 2221/2139; G06F 2221/2133; G06F 21/88
See application file for complete search history.

(56) References Cited

U.S. PATENT DOCUMENTS

| | | | |
|---|---|---|---|
| 7,034,696 B2 | 4/2006 | Ehlers | |
| 7,570,533 B1 | 8/2009 | Simmons et al. | |
| 7,571,475 B2 | 8/2009 | Moon | |
| 9,218,474 B1* | 12/2015 | Roth | G06F 21/32 |
| 9,898,880 B2 | 2/2018 | Nagisetty et al. | |
| 2003/0032407 A1 | 2/2003 | Mages | |
| 2011/0271053 A1* | 11/2011 | Schroeter | G06K 19/0723 711/115 |
| 2013/0019292 A1* | 1/2013 | Varshavsky | H04L 63/0861 726/7 |
| 2013/0031598 A1* | 1/2013 | Whelan | H04L 63/083 726/1 |

(Continued)

FOREIGN PATENT DOCUMENTS

| | | |
|---|---|---|
| EP | 3236640 A1 | 10/2017 |
| EP | 3236640 B1 | 4/2019 |

OTHER PUBLICATIONS

Glenn Langenburg, "Are one's fingerprints similar to those of his or her parents in any discernable way?" Jan. 24, 2015, Scientific American, pp. 1-5, https://www.scientificamerican.com/article/are-ones-fingerprints-sim/ (accessed Oct. 7, 2019).

(Continued)

*Primary Examiner* — Brandon Hoffman
*Assistant Examiner* — William A Corum, Jr.
(74) *Attorney, Agent, or Firm* — Banner & Witcoff, Ltd.

(57) ABSTRACT

Systems, apparatuses, and methods are described for zeroization of a computing device based on biometric information and vitality information. A computing device may store information associated with a user. The computing device may request biometric information and vitality information from one or more sensing devices. The computing device may determine, based on the requested biometric information and the requested vitality information, whether to zeroize the computing device.

21 Claims, 5 Drawing Sheets

(56) References Cited

U.S. PATENT DOCUMENTS

| | | | | |
|---|---|---|---|---|
| 2013/0081119 | A1* | 3/2013 | Sampas | G06Q 20/40145 726/7 |
| 2015/0242601 | A1* | 8/2015 | Griffiths | H04L 63/0861 726/5 |
| 2015/0242605 | A1* | 8/2015 | Du | G06F 21/32 726/7 |
| 2017/0230360 | A1* | 8/2017 | Mosenia | A61B 5/117 |
| 2019/0020676 | A1* | 1/2019 | Laughlin | H04L 63/1416 |
| 2019/0053739 | A1* | 2/2019 | Inoue | A61B 5/02416 |
| 2019/0303551 | A1* | 10/2019 | Tussy | G06Q 20/40145 |
| 2021/0049249 | A1* | 2/2021 | Falardeau | G06F 21/32 |

OTHER PUBLICATIONS

Wikipedia contributors, "Dead man's switch," Wikipedia, The Free Encyclopedia, pp. 1-7, https://en.wikipedia.org/wiki/Dead_man%27s_switch (accessed Oct. 7, 2019).

Wikipedia contributors, "Zeroisation," Wikipedia, The Free Encyclopedia, pp. 1-2, https://en.wikipedia.org/wiki/Zeroisation (accessed Oct. 7, 2019).

Wikipedia contributors, "Electroencephalography," Wikipedia, The Free Encyclopedia, pp. 1-24, https://en.wikipedia.org/wiki/Electroencephalography (accessed Oct. 7, 2019).

Wikipedia contributors, "Electronic fingerprint recognition," Wikipedia, The Free Encyclopedia, pp. 1-2, https://en.wikipedia.org/wiki/Electronic_fingerprint_recognition (accessed Oct. 7, 2019).

Wikipedia contributors, "Electrodermal activity," Wikipedia, The Free Encyclopedia, pp. 1-6, https://en.wikipedia.org/wiki/Electrodermal_activity (accessed Oct. 7, 2019).

Wikipedia contributors, "Heart rate monitor," Wikipedia, The Free Encyclopedia, pp. 1-4, https://en.wikipedia.org/wiki/Heart_rate_monitor (accessed Oct. 7, 2019).

Wikipedia contributors, "Thermopile," Wikipedia, The Free Encyclopedia, pp. 1-3, https://en.wikipedia.org/wiki/Thermopile (accessed Oct. 7, 2019).

* cited by examiner

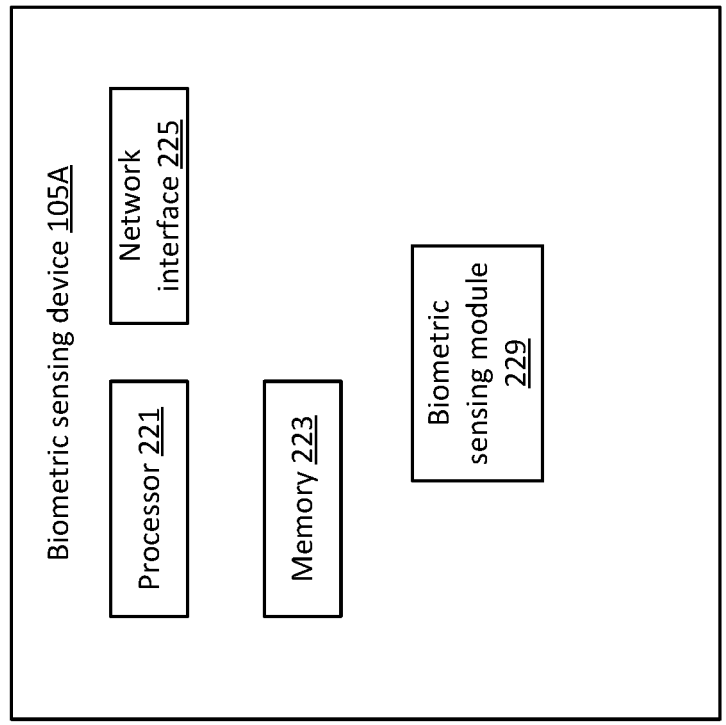
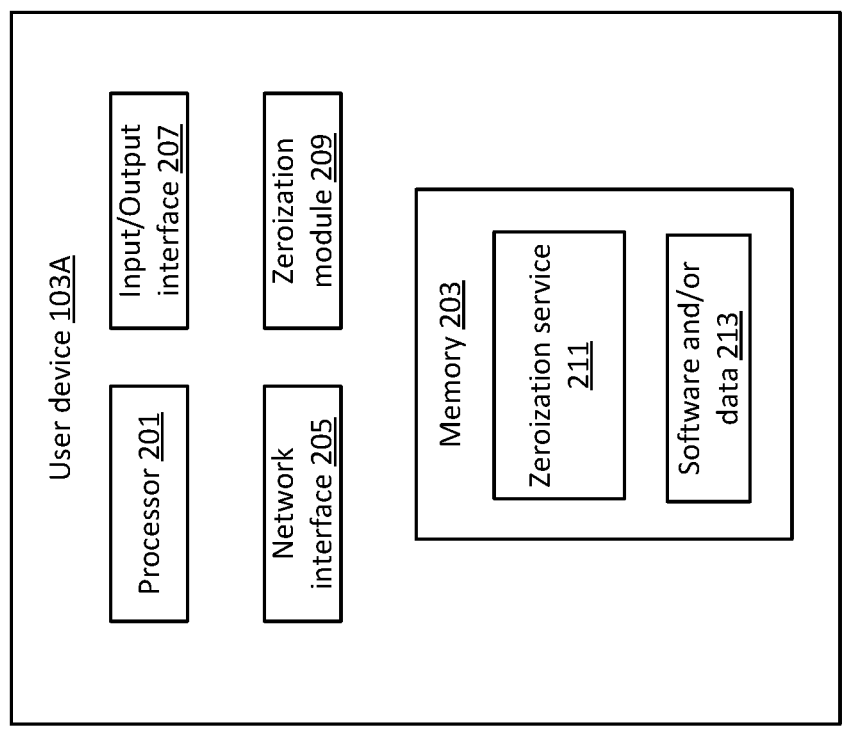
FIG. 2B
FIG. 2A

AUTOMATIC DEVICE ZEROIZATION

BACKGROUND

A user device may be configured to allow a user to manually trigger zeroization of the user device when the user device is at risk of being compromised. The zeroization of the user device may cause the deletion of information stored on the user device, and may prevent the information from being accessed by unintended entities. If the user of the user device does not have a chance to manually trigger the zeroization of the user device, the information stored on the user device may be subject to access by unintended entities.

SUMMARY

The following summary presents a simplified summary of certain features. The summary is not an extensive overview and is not intended to identify key or critical elements.

Systems, apparatuses, and methods are described for zeroization of a computing device based on biometric information and vitality information. A computing device may comprise one or more processors and memory storing instructions that, when executed by the one or more processors, cause the computing device to perform functions described herein. The computing device may send a request for biometric data. The computing device may receive the biometric data. The computing device may send a request for vitality data. The computing device may receive the vitality data. Based on determining that the biometric data corresponds to a user associated with the computing device and that the vitality data indicates that the user is alive, the computing device may provide access to data stored on the computing device.

In some examples, the computing device may send, based on a frequency of biometric data requests, multiple requests for biometric data. The computing device may send, based on a frequency of vitality data requests, multiple requests for vitality data. In some examples, the computing device may receive an indication of a type of mission associated with the computer device. The computing device may determine, based on the type of mission, one or more of the frequency of biometric data requests or the frequency of vitality data requests.

In some examples, the computing device may adjust, based on vitality data received in response to one or more of the multiple requests for vitality data, the frequency of vitality data requests. In some examples, the biometric data may comprise one or more of fingerprint data, toe print data, or iris recognition data. In some examples, the vitality data may comprise one or more of heart rate data, body temperature data, or brainwave data.

In some examples, the computing device may send, to a biometric sensing device, a request for second biometric data. The computing device may receive, from the biometric sensing device, the second biometric data. Based on determining that the second biometric data does not correspond to the user, the computing device may erase the data stored on the computing device.

In some examples, the computing device may send, to a vitality sensing device, a request for second vitality data. The computing device may receive, from the vitality sensing device, the second vitality data. Based on determining that the second vitality data does not indicate that the user is alive, the computing device may erase the data stored on the computing device.

In some examples, the computing device may send, to a biometric sensing device, a request for second biometric data. The computing device may send, to a vitality sensing device, a request for second vitality data. Based on determining that the second biometric data is not received within a period of time after the sending the request for the second biometric data or that the second vitality data is not received within the period of time after the sending the request for the second vitality data, the computing device may erase the data stored on the computing device.

In some examples, the sending the request for the biometric data may comprise sending to a first biometric sensing device. The sending the request for the vitality data may comprise sending to a first vitality sensing device. The computing device may send, to a second biometric sensing device, a request for second biometric data. The computing device may send, to a second vitality sensing device, a request for second vitality data. The computing device may receive, from the second biometric sensing device, the second biometric data. The computing device may receive, from the second vitality sensing device, the second vitality data. Based on determining that the second biometric data does not correspond to the user or that the second vitality data does not indicate that the user is alive, the computing device may erase the data stored on the computing device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 2A is a block diagram showing an example of a user device.

FIG. 2B is a block diagram showing an example of a biometric sensing device.

DETAILED DESCRIPTION

Figure 1:
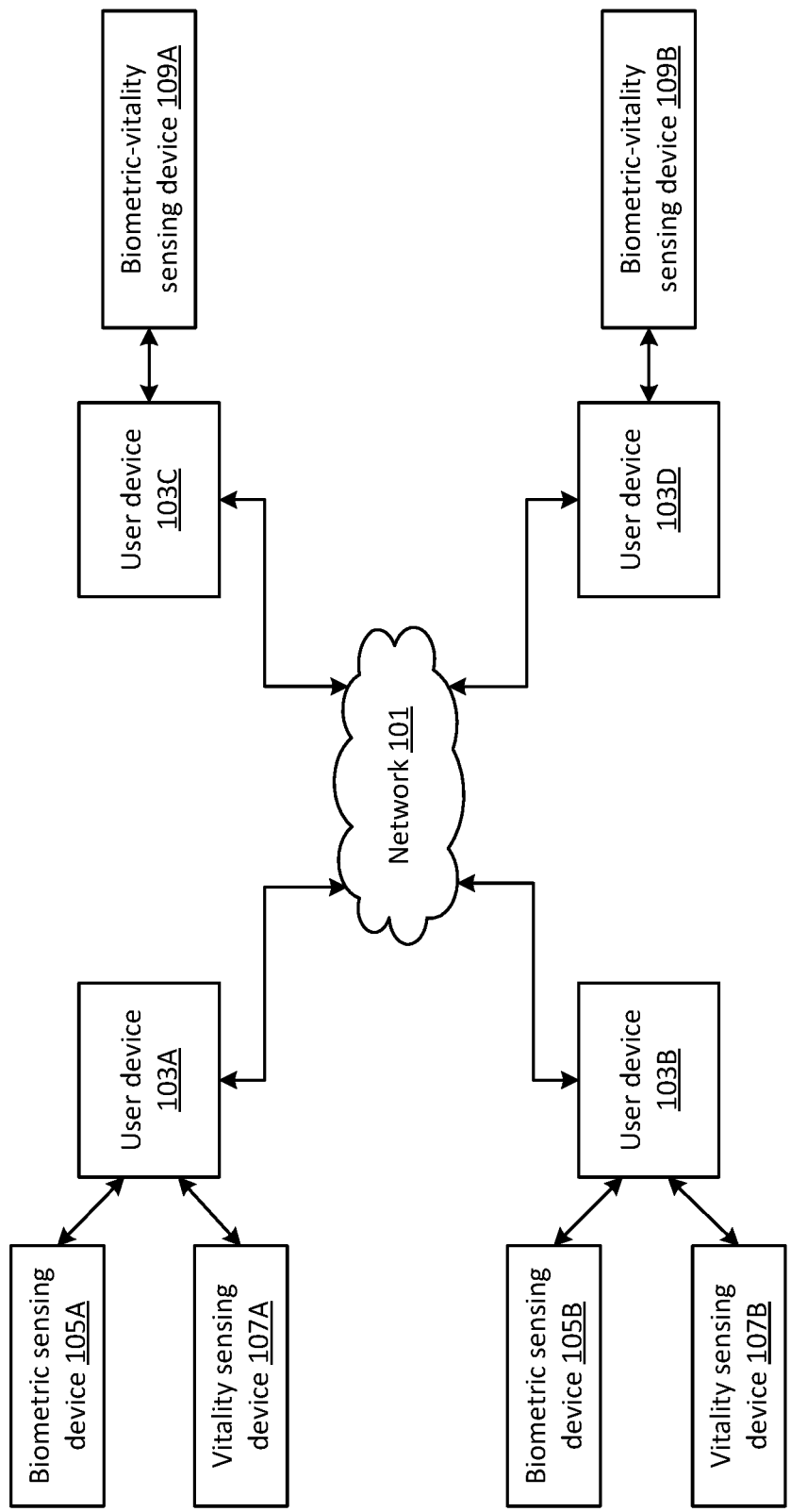
FIG. 1 shows an example system in which various features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example system in which various features described herein may be implemented. The system may comprise one or more networks (e.g., network 101), one or more user devices (e.g., user devices 103A-103D), one or more biometric sensing devices (e.g., biometric sensing devices 105A-105B), one or more vitality sensing devices (e.g., vitality sensing devices 107A-107B), and one or more biometric-vitality sensing devices (e.g., biometric-vitality sensing devices 109A-109B).

A user device of the user devices 103A-103D may comprise any type of computing device, such as an electronic device, smartphone, personal computer, tablet, desktop computer, laptop computer, gaming device, virtual reality headset, or any other type of computing device. The network 101 may comprise a single network or a collection of multiple connected networks. The network 101 may comprise one or more of any of various types of information distribution networks, such as, without limitation, a satellite network, a cellular network, a Wi-Fi network, an Ethernet network, a telephone network, an optical fiber network, a coaxial cable network, a hybrid fiber coax network, and/or the like. The network 101 may comprise a local area network (LAN), a wide area network (WAN), and/or the like. The network 101 may comprise an Internet Protocol (IP) based network (e.g., the Internet). The network 101 may use a plurality of interconnected communication links to connect the user devices 103A-103D.

The user devices 103A-103D may comprise electronic devices used by warfighters (e.g., warfighters dismounted from military vehicles). The user devices 103A-103D may communicate with each other via the network 101 (e.g., a mobile ad hoc network (MANET), a mesh network, and/or the like). The user devices 103A-103D may help the warfighters obtain situation awareness information of the battlefield. The warfighters may, for example, use the user devices 103A-103D to send and receive data related to the situational awareness of the battlefield (e.g., when the warfighters are carrying out a reconnaissance mission in an enemy territory). The user devices 103A-103D may, for example, comprise mapping functionalities to show the locations of hostile military forces and/or friendly military forces. The user devices 103A-103D may provide audio and/or video communication functionalities.

The user devices 103A-103D may store mission-sensitive data, such as sensitive parameters, cryptographic keys, critical security parameters from a cryptographic module, device configuration information, plain text passwords, secrets, and/or private keys for Secure Shell (SSH), local encryption, location authentication, and/or Internet Protocol Security (IPsec). The user devices 103A-103D may also store software (e.g., situation awareness applications) that is used by the warfighters and critical to the execution of a mission. To protect the data and/or software stored on the user devices 103A-103D from being disclosed outside of the intended users (e.g., to enemy warfighters), the user devices 103A-103D may comprise zeroization functionalities. When a risk of being compromised occurs, a warfighter may trigger the zeroization functionalities of a user device used by the warfighter. The triggered zeroization functionalities may erase the data and/or software stored on the user device (e.g., securely destroying the data stored on the user device and/or rendering the user device inoperable), and thus prevent that data from being accessed by unauthorized persons. If the warfighter, when compromised, has no time to trigger the zeroization of the warfighter's user device (e.g., if the warfighter is instantly killed by a sniper, an improvised explosive device (IED), etc.), unintended users (e.g., enemy warfighters) or other unauthorized persons may obtain access to mission-sensitive data and/or software stored on the user device.

Zeroization of a user device based on biometric information and vitality information (e.g., of the warfighter) may help alleviate these challenges. Biometric information may comprise data indicating one or more features likely to be unique to a particular individual. Examples of biometric information may include, without limitation, fingerprint data, toe print data, footprint data, iris recognition data, etc. Vitality information may comprise data indicating a measured value, for one or more characteristics (e.g., heart rate, body temperature, respiration rate, brainwave pattern, etc.) of a human body, that is consistent with a human being alive.

The user device may be configured to request the biometric information and vitality information from sensing device(s) attached to the user(s), for example, while the user device is operating. If the user device determines, based on the requested information, that the user device is being used by someone other than the intended user and/or that the user of the user device is no longer alive, the user device may automatically trigger the zeroization functionalities to zeroize the user device. More details regarding a method for zeroization based on biometric information and vitality information are described in connection with FIGS. 3A-3B.

As shown in FIG. 1, a user device of the user devices 103A-103D may be communicatively coupled to a biometric sensing device of the biometric sensing devices 105A-105B and a vitality sensing device of the vitality sensing devices 107A-107B, or may be communicatively coupled to a biometric-vitality sensing device of the biometric-vitality sensing devices 109A-109B. The sensing device(s) may be configured to capture biometric information and/or vitality information of person(s) to which the sensing device(s) are attached. The user device may obtain biometric information and/or vitality information from the sensing device(s).

A user device of the user devices 103A-103D may be connected to its corresponding sensing device(s) via any type of communication link, such as a wireless communication link (e.g., Bluetooth), a wired communication link, or a combination of the two. Using a wireless communication link to connect the user device and its corresponding sensing device(s) may make it difficult for unintended users (e.g., enemy warfighters) to discover the sensing device(s) that the intended user wears and to subsequently circumvent the zeroization of the user device.

In some examples, the user device may request biometric information from the biometric sensing device, and may request vitality information from the vitality sensing device. Using two separate sensing devices to provide the biometric information and the vitality information may make it difficult for unintended users (e.g., enemy warfighters) to identify the vitality sensing device and to use the unintended users' own vitality data to prevent the user device from being zeroized. In some examples, the user device may request biometric information and vitality information from the biometric-vitality sensing device. Using a single sensing device to provide the biometric information and the vitality information may make it difficult for unintended users to provide the needed biometric and vitality data to prevent the user device from being zeroized. In some examples, the user device may be connected to multiple sensing devices for a particular type of information. For example, the user device may be connected to multiple biometric sensing devices. In some examples, the data communicated between the user device and its corresponding sensing device(s) may be encrypted. The encryption of the data may help prevent unauthorized persons from listening to the radio frequency spectrum to detect such data and then intercepting the data communication to impede the automatic zeroization of the user device.

FIG. 2A is a block diagram showing an example of the user device 103A. The user device 103A may comprise one or more processors (e.g., processor 201), memory 203, one or more network interfaces (e.g., network interface 205), one or more input/output interfaces (e.g., input/output interface 207), and one or more zeroization modules (e.g., zeroization module 209). The user devices as described herein (e.g., the user devices 103B-103D) may comprise similar types of components.

The processor 201 may execute instructions of a computer program to perform any of the functions described herein. The instructions may be stored in the memory 203, which may comprise, for example, random access memory (RAM), read-only memory (ROM), a hard drive, removable media (e.g., a USB drive, a compact disk (CD), a digital versatile disk (DVD)) and/or in any other type of computer-readable medium or memory.

The network interface 205 may comprise, for example, a network card and/or a modem, and may be configured to communicate with a network (e.g., the network 101), biometric sensing devices (e.g., 105A-105B), vitality sensing devices (e.g., 107A-107B), and/or biometric-vitality sensing devices (e.g., 109A-109B). The network interface 205 may be a wireless interface, a wired interface, or a combination of the two. The input/output interface 207 may comprise various interface units for reading, writing, displaying, and/or printing data, such as a mouse, keyboard, touch screen, microphone, display, speaker, printer, and/or the like. Additionally or alternatively, the user device 103A may comprise a location-detecting device, such as a global positioning system (GPS) microprocessor, which may be configured to receive and process global positioning signals and determine, with possible assistance from an external server and antenna, a geographic position of the user device 103A. The user device 103A may also comprise its own power source, such as a battery.

The memory 203 may store computer-readable instructions that, when executed by one or more processors (e.g., the processor 201), may cause the user device 103A to perform any of the functions described herein. The memory 203 may store, for example, a zeroization service 211 and software and/or data 213. The software and/or data 213 may comprise, for example, situation awareness applications, mapping applications, video communication applications, audio communication applications, and/or other types of applications. The software and/or data 213 may also comprise, for example, cryptographic keys, device configuration information, critical security parameters, and/or other types of data. The zeroization service 211 may be configured to request biometric data and vitality data from connected sensing device(s), and to trigger zeroization of the user device 103A if the requested biometric data and vitality data do not indicate an intended user who is alive.

The zeroization module 209 may comprise software and/or hardware for zeroization of the user device 103A. The zeroization module 209 may receive, from the zeroization service 211, a command to zeroize. In response, the zeroization module 209 may erase all the information stored in the memory 203 and/or render the memory 203 and/or other components of the user device 103A in operable (e.g., by applying a high voltage electric charge to the memory 203 and/or the other components).

FIG. 2B is a block diagram showing an example of the biometric sensing device 105A. The biometric sensing device 105A may comprise one or more processors (e.g., processor 221), memory 223, one or more network interfaces (e.g., network interface 225), and one or more biometric sensing modules (e.g., biometric sensing module 229). The biometric sensing devices as described herein (e.g., the biometric sensing device 105B) may comprise similar types of components. The biometric sensing devices as described herein may additionally or alternatively comprise other components (e.g., similar to the components of the user device 103A).

The processor 221 may execute instructions of a computer program to perform any of the functions described herein. The instructions may be stored in the memory 223, which may comprise, for example, random access memory (RAM), read-only memory (ROM), a hard drive, removable media (e.g., a USB drive, a compact disk (CD), a digital versatile disk (DVD)) and/or in any other type of computer-readable medium or memory.

The network interface 225 may comprise, for example, a network card and/or a modem, and may be configured to communicate with a user device (e.g., the user device 103A). The network interface 225 may be a wireless interface, a wired interface, or a combination of the two. Additionally or alternatively, the biometric sensing device 105A may comprise a location-detecting device, such as a global positioning system (GPS) microprocessor, which may be configured to receive and process global positioning signals and determine, with possible assistance from an external server and antenna, a geographic position of the biometric sensing device 105A. The biometric sensing device 105A may also comprise its own power source, such as a battery.

The memory 223 may store computer-readable instructions that, when executed by one or more processors (e.g., the processor 221), may cause the biometric sensing device 105A to perform any of the functions described herein. The biometric sensing module 229 may comprise any type of device configured to capture the biometric information of a user to which the biometric sensing device 105A is attached. The biometric sensing module 229 may comprise, for example, a fingerprint sensor, toe print sensor, footprint sensor, iris recognition sensor, and/or other types of sensors. In some examples, the biometric sensing device 105A may comprise a biometric sensor configured to capture a toe print, and may be covered by a sock and footgear. The biometric sensing device 105A may be configured to send, to a connected user device (e.g., the user device 103A), the biometric data captured by the biometric sensing module 229. In some examples, the biometric sensing device 105A may comprise a chip implanted in a user, and may send, to a connected user device, information associated with the chip (e.g., a serial number of the chip) for authenticating the user.

Figure 2D:
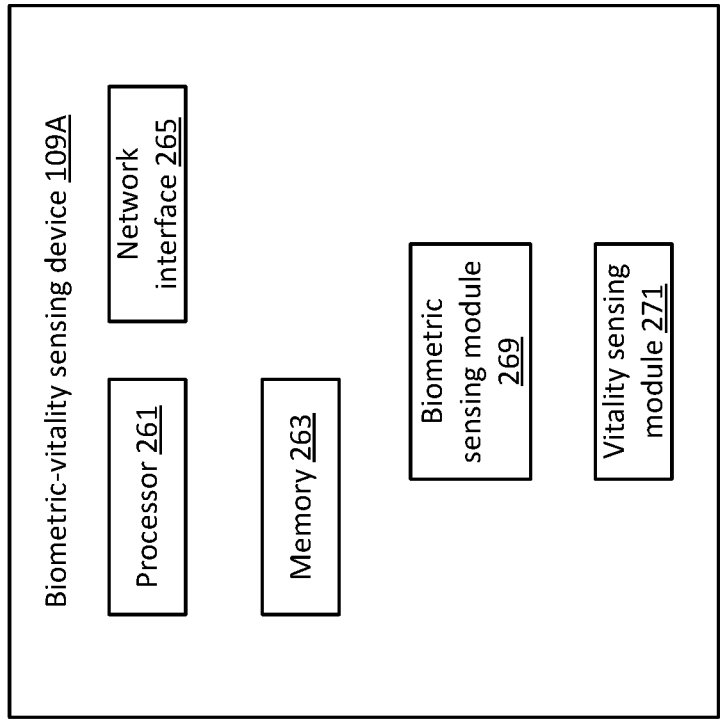
FIG. 2D is a block diagram showing an example of a biometric-vitality sensing device.
Figure 2C:
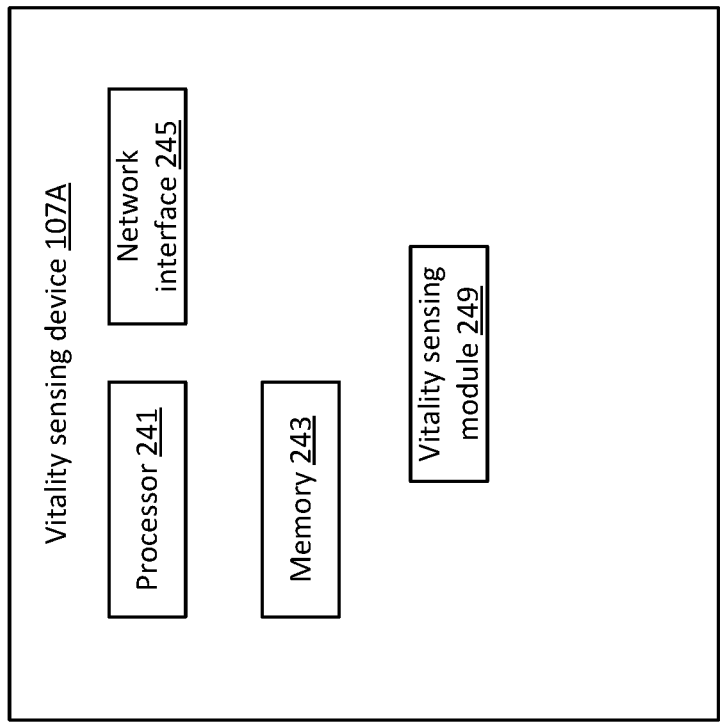
FIG. 2C is a block diagram showing an example of a vitality sensing device.

FIG. 2C is a block diagram showing an example of the vitality sensing device 107A. The vitality sensing device 107A may comprise one or more processors (e.g., processor 241), memory 243, one or more network interfaces (e.g., network interface 245), and one or more vitality sensing modules (e.g., vitality sensing module 249). The vitality sensing devices as described herein (e.g., the vitality sensing device 107B) may comprise similar types of components. The vitality sensing devices as described herein may additionally or alternatively comprise other components (e.g., similar to the components of the user device 103A).

The processor 241 may execute instructions of a computer program to perform any of the functions described herein. The instructions may be stored in the memory 243, which may comprise, for example, random access memory (RAM), read-only memory (ROM), a hard drive, removable media (e.g., a USB drive, a compact disk (CD), a digital versatile disk (DVD)) and/or in any other type of computer-readable medium or memory.

The network interface 245 may comprise, for example, a network card and/or a modem, and may be configured to communicate with a user device (e.g., the user device 103A). The network interface 245 may be a wireless interface, a wired interface, or a combination of the two. Additionally or alternatively, the vitality sensing device 107A may comprise a location-detecting device, such as a global positioning system (GPS) microprocessor, which may be configured to receive and process global positioning signals and determine, with possible assistance from an external server and antenna, a geographic position of the vitality sensing device 107A. The vitality sensing device 107A may also comprise its own power source, such as a battery.

The memory 243 may store computer-readable instructions that, when executed by one or more processors (e.g., the processor 241), may cause the vitality sensing device 107A to perform any of the functions described herein. The vitality sensing module 249 may comprise any type of device configured to capture the vitality information of a user to which the vitality sensing device 107A is attached. The vitality sensing module 249 may comprise, for example, a heart rate monitor, heart activity sensor (e.g., based on ultrasound), thermometer, brainwave sensor, respiration sensor, and/or other types of sensors. The vitality sensing device 107A may be configured to send, to a connected user device (e.g., the user device 103A), the vitality data captured by the vitality sensing module 249.

FIG. 2D is a block diagram showing an example of the biometric-vitality sensing device 109A. The biometric-vitality sensing device 109A may comprise one or more processors (e.g., processor 261), memory 263, one or more network interfaces (e.g., network interface 265), one or more biometric sensing modules (e.g., biometric sensing module 269), and one or more vitality sensing modules (e.g., vitality sensing module 271). The biometric-vitality sensing devices as described herein (e.g., the biometric-vitality sensing device 109B) may comprise similar types of components. The biometric-vitality sensing devices as described herein may additionally or alternatively comprise other components (e.g., similar to the components of the user device 103A).

The processor 261 may execute instructions of a computer program to perform any of the functions described herein. The instructions may be stored in the memory 263, which may comprise, for example, random access memory (RAM), read-only memory (ROM), a hard drive, removable media (e.g., a USB drive, a compact disk (CD), a digital versatile disk (DVD)) and/or in any other type of computer-readable medium or memory.

The network interface 265 may comprise, for example, a network card and/or a modem, and may be configured to communicate with a user device (e.g., the user device 103C). The network interface 265 may be a wireless interface, a wired interface, or a combination of the two. Additionally or alternatively, the biometric-vitality sensing device 109A may comprise a location-detecting device, such as a global positioning system (GPS) microprocessor, which may be configured to receive and process global positioning signals and determine, with possible assistance from an external server and antenna, a geographic position of the biometric-vitality sensing device 109A. The biometric-vitality sensing device 109A may also comprise its own power source, such as a battery.

The memory 263 may store computer-readable instructions that, when executed by one or more processors (e.g., the processor 261), may cause the biometric-vitality sensing device 109A to perform any of the functions described herein. The biometric sensing module 269 may comprise any type of device configured to capture the biometric information of a user to which the biometric-vitality sensing device 109A is attached. The biometric sensing module 269 may comprise, for example, a fingerprint sensor, toe print sensor, footprint sensor, iris recognition sensor, and/or other types of sensors. The vitality sensing module 271 may comprise any type of device configured to capture the vitality information of a user to which the biometric-vitality sensing device 109A is attached. The vitality sensing module 271 may comprise, for example, a heart rate monitor, heart activity sensor (e.g., based on ultrasound), thermometer, brainwave sensor, respiration sensor, and/or other types of sensors.

The biometric sensing module 269 and the vitality sensing module 271 may be located proximate to each other within the biometric-vitality sensing device 109A. For example, the biometric sensing module 269 may comprise a fingerprint sensor, and the vitality sensing module 271 may comprise a heart rate monitor for attaching to a user's finger (e.g., a finger clip). This configuration may make it more difficult for an unintended user (e.g., an enemy warfighter) to use his or her own vitality data and the intended user's biometric data to circumvent the zeroization of the user device. The biometric-vitality sensing device 109A may be configured to send, to a connected user device (e.g., the user device 103C), the biometric data captured by the biometric sensing module 269 and/or the vitality data captured by the vitality sensing module 271.

In some examples, a fingerprint sensor, a toe print sensor, or a footprint sensor may be used for the biometric sensing module 229 or 269. The fingerprint sensor, the toe print sensor, or the footprint sensor may comprise, for example, an imaging device, such as a camera, configured to capture an image of at least a part of a finger, a toe, or a foot. The processor 221 or 261 may be configured to receive requests for biometric data, and may cause the imaging device to capture images. The processor 221 or 261 may be configured to process the data from the imaging device, for example, by digitizing the data, de-noising the data, and/or applying other data processing techniques to the data. The processor 221 or 261 may be configured to send the processed data back in response to the requests.

In some examples, a temperature sensor may be used for the vitality sensing module 249 or 271. The temperature sensor may comprise, for example, a thermal measuring element, such as a thermopile, configured to determine the temperature of the object to which it is attached. The processor 241 or 261 may be configured to receive requests for vitality data, and may cause the thermal measuring element to take one or more readings. The processor 241 or 261 may be configured to process the data from the thermal measuring element, for example, by digitizing the data, filtering the data (e.g., averaging the values of the readings), and/or applying other data processing techniques to the data. The processor 241 or 261 may be configured to send the processed data back in response to the requests.

In some examples, an electroencephalography (EEG) device or galvanic sensor attached to the skin of a person may be used for the vitality sensing module 249 or 271. The EEG device or galvanic sensor may be configured to capture, for example, the brainwave data or respiration data of a user. The processor 241 or 261 may be configured to receive requests for vitality data, and may cause the EEG device or galvanic sensor to take one or more readings. The processor 241 or 261 may be configured to process the data from the EEG device or galvanic sensor, for example, by digitizing the data, filtering the data (e.g., averaging the values of the readings), and/or applying other data processing techniques to the data. The processor 241 or 261 may be configured to send the processed data back in response to the requests.

In some examples, an optical sensor may be used for the vitality sensing module 249 or 271 to determine the heart rate of a person. The optical sensor may be configured to, for example, measure changes in blood flow by measuring how a light shined from an LED through the skin scatters off blood vessels. The processor 241 or 261 may be configured to receive requests for vitality data, and may cause the optical sensor to take one or more readings. The processor 241 or 261 may be configured to process the data from the optical sensor, for example, by digitizing the data, filtering the data (e.g., averaging the values of the readings), and/or applying other data processing techniques to the data. The processor 241 or 261 may be configured to send the processed data back in response to the requests.

Figure 3A:
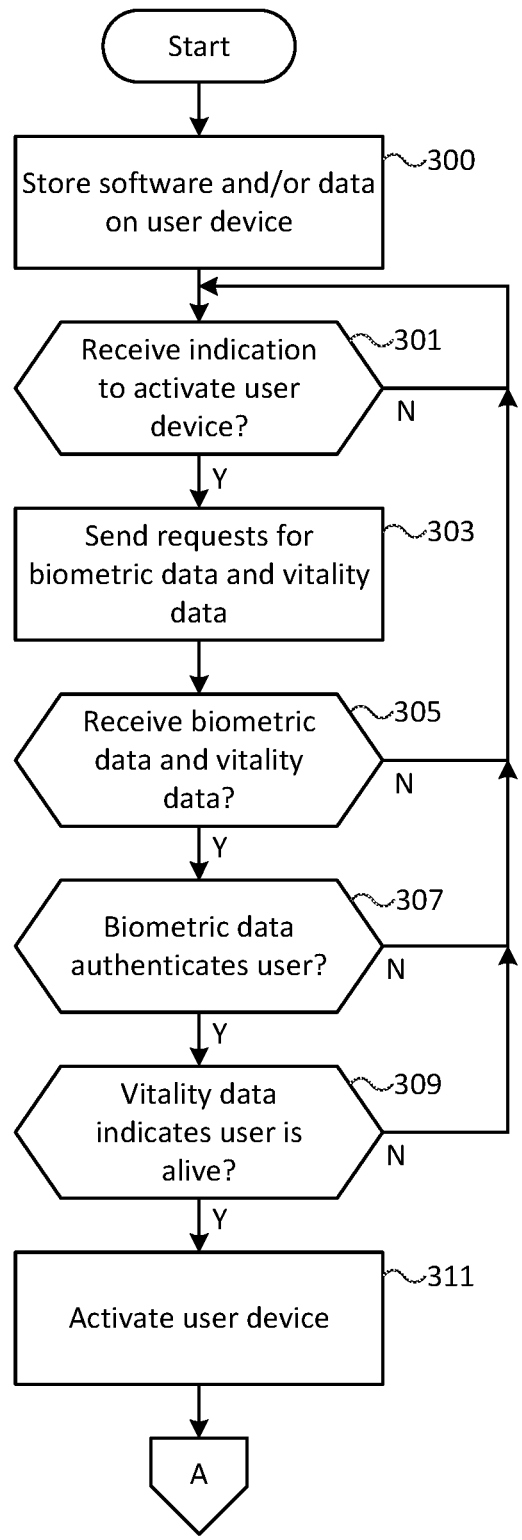
FIGS. 3A-3B are a flowchart showing an example method for zeroization based on biometric data and vitality data.
Figure 3B:
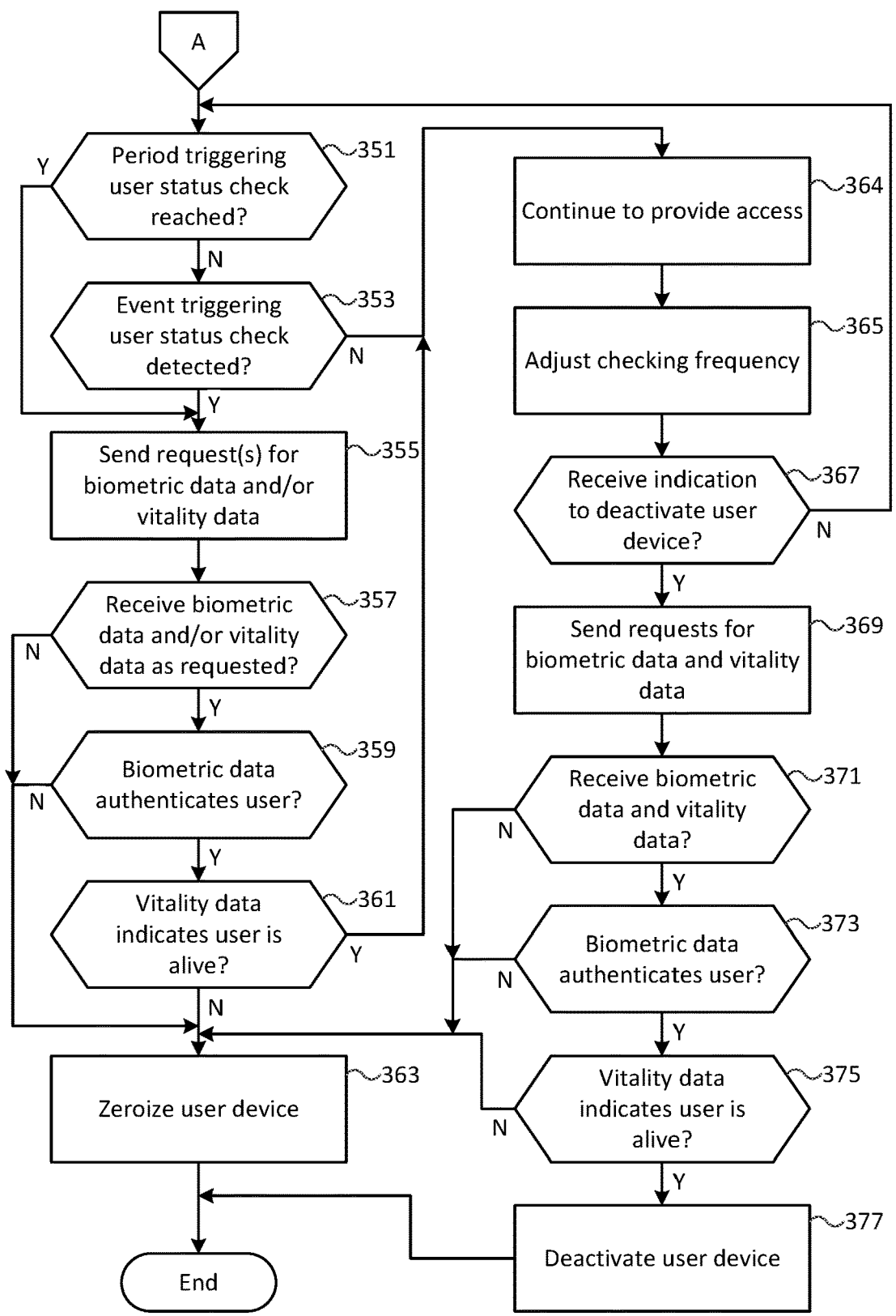

FIGS. 3A-3B are a flowchart showing an example method for zeroization based on biometric data and vitality data. The method may be performed, for example, by the system as described in connection with FIG. 1 (e.g., a user device of the user devices 103A-103D). The steps of the example method may be described as being performed by a particular computing device for the sake of simplicity, but the steps may be performed by any computing device.

In step 300, a user device (e.g., the user device 103A) may store software and/or data on the user device (e.g., in the memory 203). The software and/or data may be installed, for example, when the user device was manufactured in a factory and/or was configured in a military base. The software and/or data may comprise, for example, situation awareness applications, mapping applications, video communication applications, audio communication applications, other types of software, data associated with applications, sensitive parameters, cryptographic keys, critical security parameters from a cryptographic module, device configuration information, plain text passwords, secrets, and/or other types of data. The software and/or data may be intended to be used by particular user(s) (e.g., friendly warfighters), and not to be accessed by other user(s) (e.g., enemy warfighters).

In step 301, the user device may determine whether an indication to activate the user device is received. The indication to activate the user device may comprise, for example, user input from a user (e.g., a warfighter) corresponding to the user selecting the power button of the user device. In some examples, the indication to activate the user device may be received by the user device from another device, such as a user device associated with a commander of the warfighter. If an indication to activate the user device is not received (step 301: N), the method may repeat step 301. If an indication to activate the user device is received (step 301: Y), the method may proceed to step 303.

In step 303, the user device may send requests for biometric data and vitality data. For example, the user device may be communicatively coupled to a biometric sensing device and a vitality sensing device. The user device may send, to the biometric sensing device, a request for biometric data. The user device may send, to the vitality sensing device, a request for vitality data. Additionally or alternatively, the user device may be communicatively coupled to a biometric-vitality sensing device, and may send, to the biometric-vitality sensing device, a request for biometric data and vitality data. The user device may encrypt messages to be sent to its corresponding sensing device(s), which may be configured to decrypt the messages.

In step 305, the user device may determine whether biometric data and vitality data are received. The user device may be configured to communicate with its corresponding sensing device(s) located within a range (e.g., 1 meter, 2 meters, or 5 meters) of the user device. The communication range may be based on the network interfaces of the user device and/or the sensing device(s), and/or may be set to a particular distance (e.g., to prevent activation of the user device if the sensing device(s) are located out of the proximity of the user device). In some examples, the user device may determine whether the data are received within a period of time after sending the requests in step 303. In some examples, the user device may determine whether a communication link between the user device and its corresponding sensing device(s) is lost, indicating that the user device is removed (e.g., by enemy warfighters) to a location far away from the sensing device(s) that the intended user wears. The loss of the communication link may prevent the activation of the user device. If biometric data and vitality data are not received (step 305: N), the method may repeat step 301. If biometric data and vitality data are received (step 305: Y), the method may proceed to step 307. The sensing device(s) may encrypt messages to be sent to the corresponding user device, which may be configured to decrypt the messages.

In step 307, the user device may determine whether the biometric data as received in step 305 authenticates the user. The user device may compare the received biometric data with biometric data of the intended user of the user device. The biometric data of the intended user of the user device may be configured and stored on the user device, for example, when the user device is initially set up (e.g., in a manufacturing factory, in a military base, in a military vehicle, etc.). If the received biometric data are similar to the stored biometric data to a threshold extent, the user device may determine that the received biometric data authenticates the user. If the received biometric data are not similar to the stored biometric data to a threshold extent, the user device may determine that the received biometric data does not authenticate the user. If the biometric data as received in step 305 does not authenticate the user (step 307: N), the method may repeat step 301. If the biometric data as received in step 305 authenticates the user (step 307: Y), the method may proceed to step 309.

In step 309, the user device may determine whether the vitality data as received in step 305 indicates that the user is alive. In some examples, the vitality data may comprise heartbeat data of the user (e.g., heart rate of the user). In some examples, the vitality data may comprise data of the user's body temperature. If the vitality data as received in step 305 does not indicate that the user is alive (step 309: N), the method may repeat step 301. If the vitality data as received in step 305 indicates that the user is alive (step 309: Y), the method may proceed to step 311.

In some examples, processes performed in connection with steps 303, 305, 307, 309 may be offloaded the sensing device(s) connected to the user device. For example, the user device may send, to the sensing device(s), a request to authorize activation of the user device. In response to receiving the request, the sensing device(s) may capture user biometric data and/or user vitality data, and may determine whether the captured user biometric data authenticates the user and/or whether the captured user vitality data indicates that the user is alive. The sensing device(s) may send, to the user device, one or more indications of the determination(s). The user device may determine, based on the indications, whether to activate the user device. This configuration may help reduce the amount of data to be sent between the user device and the sensing device(s). For example, instead of sending the measured biometric data and/or the measured vitality data, the sensing device(s) may send, to the user device, a binary indication of whether the user is authenticated and/or a binary indication of whether the user is alive.

In step 311, the user device may be activated. For example, the user device may start to run situation awareness applications and/or other applications. The user device may allow the user to access the software and/or data stored on the user device. The application(s) running on the activated user device may generate data (e.g., a new map showing locations of friendly military forces), and may store the data on the user device. While activated, the user device may receive, from other devices, data (e.g., audio content or video content from another user device), and may store the data on the user device. While activated, the user device may check user status one or more times (e.g., periodically or in response to particular events) by requesting biometric data and/or vitality data, and may determine, based on the requested data, whether to trigger zeroization of the user device, as further described below. In some examples, the user device may determine, based on a location of the user device, whether to activate the user status check functionalities. The user device may, for example, use its GPS system to determine the location of the user device. The user device might not activate the user status check functionalities, for example, if the measured location of the user device is at a friendly military base. The user device may activate the user status check functionalities, for example, if the measured location of the user device is outside a friendly military base and/or beyond a threshold distance to friendly military vehicle(s).

In step 351 (FIG. 3B), the user device may determine whether a period triggering a user status check has been reached. The user device may be configured to periodically check the status of the user to determine whether to zeroize the user device. The period may comprise, for example, a one-second interval, a 30-second interval, a one-minute interval, a five-minute interval, etc. The period may additionally or alternatively be adjusted based on various factors, as further described in connection with step 365. The user device may, for example, set up a timer corresponding to the period, and if the timer expires, the user device may determine the period triggering the user status check has been reached. In some examples, a period may be used for periodic check of both user biometric data and user vitality data. Alternatively, a first period may be used for periodic check of user biometric data, and a second period (e.g., same as or different from the first period) may be used for periodic check of user vitality data. If the period triggering the user status check has not been reached (step 351: N), the method may proceed to step 353. If the period triggering the user status check has been reached (step 351: Y), the method may proceed to step 355.

In step 353, the user device may determine whether an event triggering a user status check has been detected. The event may comprise, for example, a sudden movement of the user, activation of firearm by the user, receipt of certain content from other user devices connected to the user device (e.g., a command to retreat to military base), and/or other types of events. The user device may detect the event using various sensors (e.g., accelerometers, microphones) and/or by analyzing the content received by the user device. If an event triggering the user status check has been detected (step 353: Y), the method may proceed to step 355. If an event triggering the user status check has not been detected (step 353: N), the method may proceed to step 364.

In step 355, the user device may send requests for biometric data and vitality data. For example, the user device may be communicatively coupled to a biometric sensing device and a vitality sensing device. The user device may send, to the biometric sensing device, a request for biometric data. The user device may send, to the vitality sensing device, a request for vitality data. Additionally or alternatively, the user device may be communicatively coupled to a biometric-vitality sensing device, and may send, to the biometric-vitality sensing device, a request for biometric data and vitality data. The user device may encrypt messages to be sent to its corresponding sensing device(s), which may be configured to decrypt the messages. In some examples, the user device may send a request for a particular type of data of biometric data and vitality data. For example, if the user device uses two independent periods for the periodic check of biometric data and vitality data respectively, and if the period triggering one of the two types of data has been reached, the user device may send a request for the one type of data.

In step 357, the user device may determine whether biometric data and/or vitality data as requested in step 355 are received. The user device may be configured to communicate with its corresponding sensing device(s) located within a range (e.g., 1 meter, 2 meters, or 5 meters) of the user device. The communication range may be based on the network interfaces of the user device and/or the sensing device(s), and/or may be set to a particular distance (e.g., to allow for zeroization of the user device in response to the sensing device(s) moving out of the proximity of the user device). In some examples, the user device may determine whether the requested data are received within a period of time after sending the request(s) in step 355. In some examples, the user device may determine whether a communication link between the user device and its corresponding sensing device(s) is lost, indicating that the user device is removed (e.g., by enemy warfighters) to a location far away from the sensing device(s) that the intended user wears. The loss of the communication link may trigger the user device to zeroize. For example, if a warfighter is captured by enemy warfighters, the warfighter may still be alive, and may still wear the sensing device(s). If the enemy warfighters remove the user device from the warfighter without taking the sensing device(s) (e.g., as the sensing device(s) may be hidden and not hard wired), and if the sensing device(s) are out of the proximity of the user device, the communicate link between the sensing device(s) and the user device may be lost, and the user device may zeroize. If biometric data and/or vitality data as requested in step 355 are not received (step 357: N), the method may proceed to step 363. If biometric data and/or vitality data as requested in step 355 are received (step 357: Y), the method may proceed to step 359. In some examples, step 359 might not be performed and the method may proceed to step 361, for example, if the user device did not send a request for biometric data in step 355. The sensing device(s) may encrypt messages to be sent to the corresponding user device, which may be configured to decrypt the messages.

In step 359, the user device may determine whether the biometric data as received in step 357 authenticates the user. The user device may compare the received biometric data with biometric data of the intended user of the user device. The biometric data of the intended user of the user device may be configured and stored on the user device, for example, when the user device is initially set up (e.g., in a manufacturing factory, in a military base, in a military vehicle, etc.). If the received biometric data are similar to the stored biometric data to a threshold extent, the user device may determine that the received biometric data authenticates the user. If the received biometric data are not similar to the stored biometric data to a threshold extent, the user device may determine that the received biometric data does not authenticate the user. If the biometric data as received in step 357 does not authenticate the user (step 359: N), the method may proceed to step 363. If the biometric data as received in step 357 authenticates the user (step 359: Y), the method may proceed to step 361. In some examples, step 361 might not be performed and the method may proceed to step 364, for example, if the user device did not send a request for vitality data in step 355.

In step 361, the user device may determine whether the vitality data as received in step 357 indicates that the user is alive. In some examples, the vitality data may comprise heartbeat data of the user (e.g., heart rate of the user). In some examples, the vitality data may comprise data of the user's body temperature. If the vitality data as received in step 357 does not indicate that the user is alive (step 361: N), the method may proceed to step 363. If the vitality data as received in step 357 indicates that the user is alive (step 361: Y), the method may proceed to step 364.

In some examples, processes performed in connection with user status check (e.g., in steps 351, 353, 355, 357, 359, 361, 365) may be offloaded the sensing device(s) connected to the user device. For example, periodically, the sensing device(s) may capture user biometric data and/or user vitality data, and may determine whether the captured user biometric data authenticates the user and/or whether the captured user vitality data indicates that the user is alive. The sensing device(s) may send, to the user device, one or more indications of the determination(s). The user device may determine, based on the indications, whether to zeroize the user device. This configuration may help reduce the amount of data to be sent between the user device and the sensing device(s). For example, instead of sending the measured biometric data and/or the measured vitality data, the sensing device(s) may send, to the user device, a binary indication of whether the user is authenticated and/or a binary indication of whether the user is alive.

In step 363, the user device may be zeroized. This step may comprise, for example, sending a signal to the zeroization module 209 of the user device 103A to cause the zeroization module 209 to erase data stored on the user device 103A. The user device may erase all of the information stored on the user device. The user device may delete the data and/or software stored in the memory of the user device. The user device may additionally or alternatively overwrite the information stored in the memory with all zeros, all ones, or random values. The user device may conduct the overwriting one or more times. Additionally or alternatively, the user device may apply high voltage electric charge to the memory of the user device, rending the memory inoperable. Various other methods to zeroize the user device may be used as desired and understood by a person of ordinary skill in the art.

In step 364, the user device may continue to provide access to software and/or data stored on the user device. The user may continue to have access to the software and/or data stored on the user device. In step 365, the user device may adjust the checking frequency for periodically checking the status of the user. The checking frequency may be adjusted based on, for example, the mission that the warfighter using the user device is carrying out. The user device may receive user input of the type of mission that the warfighter is carrying out. The user device may additionally or alternatively receive, from other user devices (e.g., from a mission commander's user device), an indication of the type of mission to be carried out in connection with the user device. The user device may set the checking frequency to be higher, for example, if the type of mission involves a higher likelihood of the warfighter being compromised, such as a reconnaissance mission deeper into enemy territory and further away from military vehicle support. The user device may set the checking frequency to be lower, for example, if the type of mission involves a lower likelihood of the warfighter being compromised, such as a carefully planned strike with support from military vehicles.

In some examples, the checking frequency may be adjusted based on a location of the user device. The user device may determine the location of the user device, for example, using the GPS system in the user device. The user device may set the checking frequency to be higher, for example, if the location of the user device corresponds to a location in the enemy territory. The user device may set the checking frequency to be lower, for example, if the location of the user device corresponds to a location in or near a friendly military base. In some examples, the checking frequency may be adjusted based on the vitality data of the user of the user device. For example, the user device may adjust the checking frequency based on the heart rate data as received in step 357. If the heart rate of the user is higher, the user device may set the checking frequency to be higher. If the heart rate of the user is lower, the user device may set the checking frequency to be lower. In this manner, a higher heart rate of the user (e.g., indicating a more dynamically changing battlefield situation) may cause the user device to check the status of the user more frequently. Adjusting the checking frequency as described herein may allow the user device and/or its connected sensing device(s) to save energy by adjusting the checking frequency based on the perceived risk level.

In some examples, one checking frequency may be used for the periodic check of both user biometric data and user vitality data, and the one checking frequency may be adjusted in the manners as described herein. Alternatively, two independent checking frequencies may be used for the periodic check of user biometric data and user vitality data respectively. The two checking frequencies may be adjusted in same or different manners. For example, a checking frequency for the periodic check of user biometric data may be adjusted based on the mission type associated with the user device, and a checking frequency for the periodic check of user vitality data may be adjusted based on received vitality data (e.g., heart rate data).

In step 367, the user device may determine whether an indication to deactivate the user device is received. The indication to deactivate the user device may comprise, for example, user input from a user (e.g., a warfighter) corresponding to the user selecting the power button of the user device. In some examples, the indication to deactivate the user device may be received by the user device from another device, such as another user device (e.g., associated with a commander of the warfighter). If an indication to deactivate the user device is not received (step 367: N), the method may repeat step 351. If an indication to deactivate the user device is received (step 367: Y), the method may proceed to step 369. In response to receiving an indication to deactivate the user device, the user device may be configured to conduct another round of user status checking before the user device is deactivated without zeroization. This configuration may prevent an unintended user or an unauthorized person from circumventing zeroization of the user device by turning off the user device.

In step 369, the user device may send requests for biometric data and vitality data. For example, the user device may be communicatively coupled to a biometric sensing device and a vitality sensing device. The user device may send, to the biometric sensing device, a request for biometric data. The user device may send, to the vitality sensing device, a request for vitality data. Additionally or alternatively, the user device may be communicatively coupled to a biometric-vitality sensing device, and may send, to the biometric-vitality sensing device, a request for biometric data and vitality data. The user device may encrypt messages to be sent to its corresponding sensing device(s), which may be configured to decrypt the messages.

In step 371, the user device may determine whether biometric data and vitality data are received. The user device may be configured to communicate with its corresponding sensing device(s) located within a range (e.g., 1 meter, 2 meters, or 5 meters) of the user device. The communication range may be based on the network interfaces of the user device and/or the sensing device(s), and/or may be set to a particular distance (e.g., to allow for zeroization of the user device in response to the sensing device(s) moving out of the proximity of the user device). In some examples, the user device may determine whether the data are received within a period of time after sending the requests in step 369. In some examples, the user device may determine whether a communication link between the user device and its corresponding sensing device(s) is lost, indicating that the user device is removed (e.g., by enemy warfighters) to a location far away from the sensing device(s) that the intended user wears. The loss of the communication link may trigger the user device to zeroize. For example, if a warfighter is captured by enemy warfighters, the warfighter may still be alive, and may still wear the sensing device(s). If the enemy warfighters remove the user device from the warfighter without taking the sensing device(s) (e.g., as the sensing device(s) may be hidden and not hard wired), and if the sensing device(s) are out of the proximity of the user device, the communicate link between the sensing device(s) and the user device may be lost, and the user device may zeroize. If biometric data and vitality data are not received (step 371: N), the method may proceed to step 363. If biometric data and vitality data are received (step 371: Y), the method may proceed to step 373. The sensing device(s) may encrypt messages to be sent to the corresponding user device, which may be configured to decrypt the messages.

In step 373, the user device may determine whether the biometric data as received in step 371 authenticates the user. The user device may compare the received biometric data with biometric data of the intended user of the user device. The biometric data of the intended user of the user device may be configured and stored on the user device, for example, when the user device is initially set up (e.g., in a manufacturing factory, in a military base, in a military vehicle, etc.). If the received biometric data are similar to the stored biometric data to a threshold extent, the user device may determine that the received biometric data authenticates the user. If the received biometric data are not similar to the stored biometric data to a threshold extent, the user device may determine that the received biometric data does not authenticate the user. If the biometric data as received in step 371 does not authenticate the user (step 373: N), the method may proceed to step 363. If the biometric data as received in step 371 authenticates the user (step 373: Y), the method may proceed to step 375.

In some examples, processes performed in connection with steps 369, 371, 373, 375 may be offloaded the sensing device(s) connected to the user device. For example, the user device may send, to the sensing device(s), a request to authorize deactivation of the user device. In response to receiving the request, the sensing device(s) may capture user biometric data and/or user vitality data, and may determine whether the captured user biometric data authenticates the user and/or whether the captured user vitality data indicates that the user is alive. The sensing device(s) may send, to the user device, one or more indications of the determination(s). The user device may determine, based on the indications, whether to deactivate the user device. This configuration may help reduce the amount of data to be sent between the user device and the sensing device(s). For example, instead of sending the measured biometric data and/or the measured vitality data, the sensing device(s) may send, to the user device, a binary indication of whether the user is authenticated and/or a binary indication of whether the user is alive.

In step 375, the user device may determine whether the vitality data as received in step 371 indicates that the user is alive. In some examples, the vitality data may comprise heartbeat data of the user (e.g., heart rate of the user). In some examples, the vitality data may comprise data of the user's body temperature. If the vitality data as received in step 371 does not indicate that the user is alive (step 375: N), the method may proceed to step 363. If the vitality data as received in step 371 indicates that the user is alive (step 375: Y), the method may proceed to step 377. In step 377, the user device may be deactivated. For example, the user device may end the execution of situation awareness applications and/or other applications. The user device may be powered off.

In some examples, the user device may be communicatively coupled to multiple sensing devices for a particular type of information based on which the user device may determine whether to zeroize the user device. For example, the user device may be connected to multiple biometric sensing devices (e.g., to a fingerprint sensing device and a toe print sensing device). The user device may be configured to request the particular type of information from the multiple corresponding sensing devices. The user device may determine, based on the information from the multiple corresponding sensing devices, whether to zeroize the user device. For example, multiple sets of biometric data may be received from multiple biometric sensing devices. If any of the multiple sets of biometric data does not authenticate the user (e.g., if a set of biometric data indicates that the corresponding biometric sensing device is attached to an unintended user), zeroization of the user device may be triggered. The user device may be configured with multiple vitality sensing devices or multiple biometric-vitality sensing devices in a similar manner. This may reduce the likelihood of an unintended user (e.g., enemy warfighter) discovering all of the sensing devices and circumventing the zeroization of the user device.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:
1. A method comprising:
sending, by a computing device, a request for biometric data;
receiving, by the computing device and in response to the request for biometric data, encrypted biometric data;
sending, by the computing device, a request for first vitality data;

receiving, by the computing device and in response to the request for first vitality data, encrypted first vitality data;

decrypting, by the computing device, the encrypted biometric data and the encrypted first vitality data;

authenticating, by the computing device and based on the decrypted biometric data, a human user of the computing device;

determining, by the computing device and based on the decrypted first vitality data, that the human user is alive;

based on the authenticating the human user, based on the determining that the human user is alive, and based on determining that one or more sensing devices are within a predetermined range of the computing device, providing, by the computing device, access to data stored in a memory of the computing device;

determining, by the computing device and based on second vitality data associated with providing the access, that the human user is not alive; and based on the determining that the human user is not alive, erasing, by the computing device, the data stored in the memory by at least one of:

overwriting the data stored in the memory; or rendering the memory inoperable by applying an electric charge to the memory.

2. The method of claim 1, further comprising:

sending, based on a frequency of biometric data requests, multiple requests for biometric data; and sending, based on a frequency of vitality data requests, multiple requests for vitality data.

3. The method of claim 2, further comprising:

receiving, by the computing device, an indication of a type of mission associated with the computing device; and determining, by the computing device and based on the type of mission, one or more of the frequency of biometric data requests or the frequency of vitality data requests.

4. The method of claim 2, further comprising:

adjusting, by the computing device and based on vitality data received in response to one or more of the multiple requests for vitality data, the frequency of vitality data requests.

5. The method of claim 1, wherein the biometric data comprises one or more of fingerprint data, toe print data, or iris recognition data.

6. The method of claim 1, wherein each of the decrypted first vitality data and the second vitality data comprises one or more of heart rate data, body temperature data, or brainwave data.

7. The method of claim 1, further comprising:

sending, by the computing device and to the one or more sensing devices, a request for second biometric data;

receiving, by the computing device and from the one or more sensing devices, encrypted second biometric data; and decrypting the encrypted second biometric data, wherein the erasing the data stored in the memory is after determining that the decrypted second biometric data corresponds to the human user and that the human user is not alive.

8. The method of claim 1, further comprising:

sending, by the computing device and to the one or more sensing devices, a request for the second vitality data after the providing the access to the data stored in the memory; and receiving, by the computing device and from the one or more sensing devices, encrypted second vitality data; and decrypting, by the computing device, the encrypted second vitality data to produce the second vitality data, wherein the sending the request for the first vitality data comprises sending, to the one or more sensing devices, the request for the first vitality data.

9. The method of claim 1, further comprising:

sending, by the computing device and to the one or more sensing devices, a request for second biometric data; and sending, by the computing device and to the one or more sensing devices, a request for the second vitality data;

wherein the erasing the data stored in the memory is after determining that encrypted second biometric data is received within a period of time after the sending the request for the second biometric data and that an encrypted form of the second vitality data is received within the period of time after the sending the request for the second vitality data.

10. The method of claim 1, further comprising:

sending, by the computing device and to the one or more sensing devices, a request for second biometric data;

sending, by the computing device and to the one or more sensing devices, a request for the second vitality data;

receiving, by the computing device and from the one or more sensing devices, encrypted second biometric data; and receiving, by the computing device and from the one or more sensing devices, encrypted second vitality data;

wherein the erasing the data stored in the memory is after processing decrypted second biometric data.

11. A computing device comprising:

one or more processors; and memory storing instructions that, when executed by the one or more processors, cause the computing device to:

send a request for biometric data;

receive, in response to the request for biometric data, encrypted biometric data;

send a request for first vitality data;

receive, in response to the request for the first vitality data, encrypted first vitality data;

decrypt the encrypted biometric data and the encrypted first vitality data;

authenticate, based on the decrypted biometric data, a human user of the computing device;

determine, based on the decrypted first vitality data, that the human user is alive;

based on authenticating the human user, based on determining that the human user is alive, and based on determining one or more sensing devices are within a predetermined range of the computing device, provide access to data stored in the memory;

determine, based on second vitality data associated with providing the access, that the human user is not alive; and based on the determining that the human user is not alive, erase the data stored in the memory by at least one of:

overwriting the data stored in the memory; or rendering the memory inoperable by applying an electric charge to the memory.

12. The computing device of claim 11, wherein the instructions, when executed by the one or more processors, further cause the computing device to:

send, based on a frequency of biometric data requests, multiple requests for biometric data; and send, based on a frequency of vitality data requests, multiple requests for vitality data.

13. The computing device of claim 11, wherein the instructions, when executed by the one or more processors, further cause the computing device to:

send, to the one or more sensing devices, a request for second biometric data;

receive, from the one or more sensing devices, encrypted second biometric data; and decrypt the encrypted second biometric data, wherein the instructions, when executed by the one or more processors, cause the computing device to erase the data stored in the memory after determining that the decrypted second biometric data corresponds to the human user and that the human user is not alive.

14. The computing device of claim 11, wherein the instructions, when executed by the one or more processors, further cause the computing device to:

send, to the one or more sensing devices, a request for the second vitality data after the providing the access to the data stored in the memory;

receive, from the one or more sensing devices, encrypted second vitality data; and decrypt the encrypted second vitality data to produce the second vitality data, wherein the instructions, when executed by the one or more processors, cause the computing device to send the request for the first vitality data by sending, to the one or more sensing devices, the request for the first vitality data.

15. The computing device of claim 11, wherein the instructions, when executed by the one or more processors, further cause the computing device to:

send, to the one or more sensing devices, a request for second biometric data; and send, to the one or more sensing devices, a request for the second vitality data;

wherein the instructions, when executed by the one or more processors, cause the computing device to erase the data stored in the memory after determining that encrypted second biometric data is received within a period of time after the sending the request for the second biometric data and that an encrypted form of the second vitality data is received within the period of time after the sending the request for the second vitality data.

16. One or more non-transitory computer-readable media storing instructions that, when executed by one or more processors, cause a computing device to:

send a request for biometric data;

receive, in response to the request for biometric data, encrypted biometric data;

send a request for first vitality data;

receive, in response to the request for the first vitality data, encrypted first vitality data;

decrypt the encrypted biometric data and the encrypted first vitality data;

authenticate, based on the decrypted biometric data, a human user of the computing device;

determine, based on the decrypted first vitality data, that the human user is alive;

based on authenticating the human user, based on determining that the human user is alive, and based on determining that one or more sensing devices are within a predetermined range of the computing device, provide access to data stored in a memory of the computing device;

determine, based on second vitality data associated with providing the access, that the human user is not alive; and based on the determining that the human user is not alive, erase the data stored in the memory by at least one of:
 overwriting the data stored in the memory; or
 rendering the memory inoperable by applying an electric charge to the memory.

17. The one or more non-transitory computer-readable media of claim 16, wherein the instructions, when executed by the one or more processors, further cause the computing device to:

send, based on a frequency of biometric data requests, multiple requests for biometric data; and send, based on a frequency of vitality data requests, multiple requests for vitality data.

18. The one or more non-transitory computer-readable media of claim 16, wherein the instructions, when executed by the one or more processors, further cause the computing device to:

send, to the one or more sensing devices, a request for second biometric data;

receive, from the one or more sensing devices, encrypted second biometric data; and decrypt the encrypted second biometric data, wherein the instructions, when executed by the one or more processors, cause the computing device to erase the data stored in the memory after determining that the decrypted second biometric data corresponds to the human user and that the human user is not alive.

19. The one or more non-transitory computer-readable media of claim 16, wherein the instructions, when executed by the one or more processors, further cause the computing device to:

send, to the one or more sensing devices, a request for the second vitality data after the providing the access to the data stored in the memory;

receive, from the one or more sensing devices, encrypted second vitality data; and decrypt the encrypted second vitality data to produce the second vitality data, wherein the instructions, when executed by the one or more processors, cause the computing device to send the request for the first vitality data by sending, to the one or more sensing devices, the request for the first vitality data.

20. The one or more non-transitory computer-readable media of claim 16, wherein the instructions, when executed by the one or more processors, further cause the computing device to:

send, to the one or more sensing devices, a request for second biometric data; and send, to the one or more sensing devices, a request for the second vitality data;

wherein the instructions, when executed by the one or more processors, cause the computing device to erase the data stored in the memory after determining that encrypted second biometric data is received within a period of time after the sending the request for the second biometric data and that an encrypted form of the second vitality data is received within the period of time after the sending the request for the second vitality data.

21. The method of claim 1, wherein the erasing the data stored in the memory is further based on a determination that the one or more sensing devices are not within the predetermined range of the computing device.

* * * * *